United States Patent [19]

Hsin-Min

[11] Patent Number: 4,496,018
[45] Date of Patent: Jan. 29, 1985

[54] STEERING COLUMN-OPERATED ACCELERATING AND BRAKING DEVICE FOR AUTOMOBILES

[76] Inventor: Lo Hsin-Min, 47, Shih Chien St., Hsin Chu City, Taiwan

[21] Appl. No.: 484,615

[22] Filed: Apr. 13, 1983

[51] Int. Cl.³ ............................................. B62D 1/18
[52] U.S. Cl. ...................................... 180/78; 280/775
[58] Field of Search .................... 180/78; 280/775; 74/481, 482, 484 R, 492

[56] References Cited

U.S. PATENT DOCUMENTS

| 647,262 | 4/1900 | Hay | 180/78 |
| 680,602 | 8/1901 | Lieb | 180/78 |
| 781,989 | 2/1905 | Ball | 180/78 |
| 3,533,302 | 10/1970 | Hansen | 280/775 |
| 3,580,101 | 5/1971 | Jorgensen | 280/775 |
| 3,628,396 | 12/1971 | Grobowski | 280/775 |
| 4,077,487 | 3/1978 | Misivchuk | 180/78 |
| 4,217,792 | 8/1980 | Kesling | 280/775 |

*Primary Examiner*—Richard A. Bertsch
*Attorney, Agent, or Firm*—Shoemaker and Mattare, Ltd.

[57] ABSTRACT

A steering column operated accelerating and braking device for automobiles, having a steering column pivotally mounted to the chassis of the automobile so as to be able to pivot fore and aft; an accelerator unit and a brake unit operatively connected to the steering column, so that the accelerator unit and the brake unit are actuated by pivoting the steering column. The steering column is magnetically held in position when not being pushed or pulled to pivot.

5 Claims, 14 Drawing Figures

STEERING COLUMN-OPERATED ACCELERATING AND BRAKING DEVICE FOR AUTOMOBILES

BACKGROUND OF THE INVENTION

This invention relates to an accelerating and braking device, particularly to a steering column-operated accelerating and braking device for automobiles.

Automobiles are generally provided with an accelerator for controlling the speed of the vehicle and a brake for slowing down or stopping the vehicle. Conventionally the accelerator and brake are individually operated by foot, or by hand in some special models. With such a conventional arrangement one must acquire a certain level of skill before he can drive a vehicle safely and properly as he must also operate a steering wheel and a gear shift lever in addition to the accelerator and brake.

To simplify driving operations, this invention provides a novel steering column-operated accelerating and braking device for automobiles, wherein the accelerator and the brake are operatively connected to the steering column whose lower end is pivotally mounted to the chassis of the vehicle, so that by pivotally moving the steering column fore and aft the accelerator and brake are actuated in association with the pivotal movement of the steering column.

BRIEF DESCRIPTION OF THE INVENTION

This invention provides a steering column-operated accelerating and braking device for automobiles, having a steering column which can be pushed or pulled to pivot fore and aft, an accelerator unit and a brake unit operatively connected to the steering column, so that the accelerator unit and the brake unit are actuated by pivoting the steering column. The steering column is magnetically held in position when the steering column is not being pushed or pulled to pivot.

DETAILED DESCRIPTION OF THE INVENTION

Figure 1:
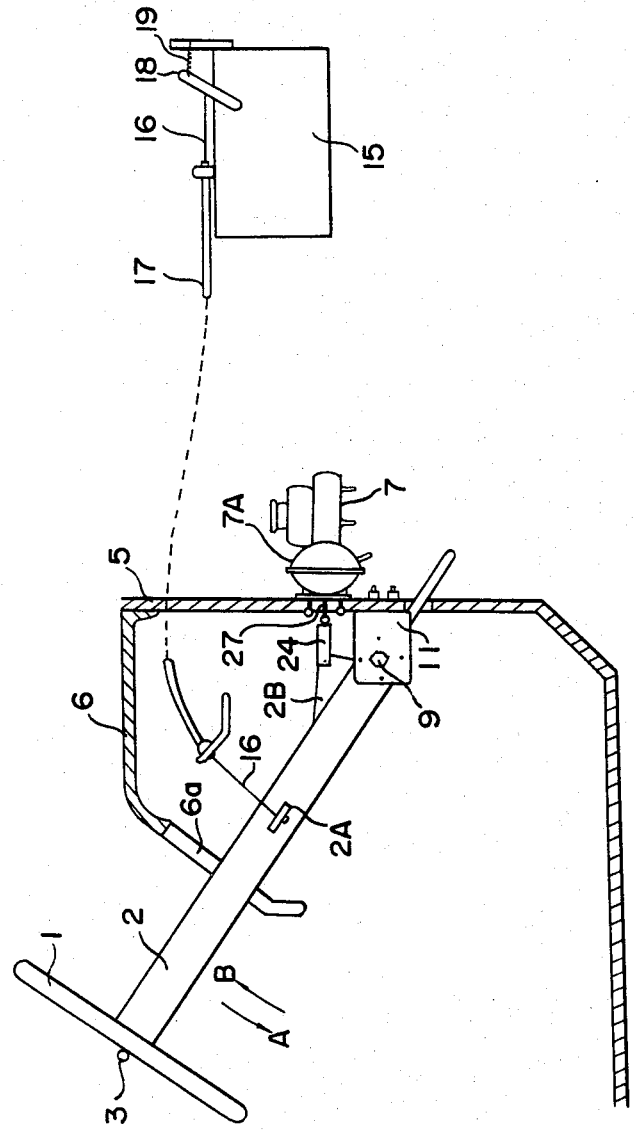
FIG. 1 is a schematic diagram of a first embodiment of the steering column-operated accelerating and braking device of this invention, showing the general arrangement.

Referring to FIG. 1, there is shown a first embodiment of the steering column-operated accelerating and braking device for automobiles of this invention, which comprises a steering column 2 for supporting therein a steering shaft 3 operable by steering wheel 1 rotatably mounted on the upper end of steering column 2 while the lower end of steering column 2 is pivotally mounted onto base 11 with pivot pin 9, base 11 being fixedly secured to chassis 5, steering column 2 having a first bracket 2A to which accelerator cable 16 is connected, and a second bracket 2B to which piston rod 27 of master brake cylinder 7 is operatively connected by an adapter 24 to be described later. In the drawing, 6 is an automobile dashboard, 6a is a cutout in dashboard 6 for accommodating steering column 2. Master brake cylinder 7 is provided with a vacuum booster 7A, and the other end of the accelerator cable 16 is passed through a flexible tube 17 and connected to a throttle lever 18 provided with a return spring 19. Throttle lever 18 is adapted to actuate accelerating unit 15, which may be a carburetor for a gasoline motor, or a fuel metering unit for a diesel engine.

The lower end of steering column 2 is so mounted that steering column 2 is capable of pivoting clockwise with respect to the pivotal pin 9, or in the forward direction designated by arrow B. (FIG. 1), and counter-clockwise or in the rearward direction designated by arrow A (FIG. 1). Accelerator cable 16 is connected to first bracket 2A of steering column 2 in such a manner that accelerator cable 16 is pulled to actuate accelerating unit 15, or to accelerate the automobile when steering column 2 is pulled by the driver to pivot rearward, and that accelerator cable 16 is released to decelerate the automobile when steering column 2 is pushed to pivot forward. Piston rod 27 of master brake cylinder 7 is connected to second bracket 2B of steering column 2 in such a manner that piston rod 27 is pushed to actuate master brake cylinder 7 to apply the brake on the automobile when steering column 2 is pushed to pivot forward, and that piston rod 27 is allowed to return so as to release the brake when steering column 2 is pulled to pivot rearward.

Figure 2:
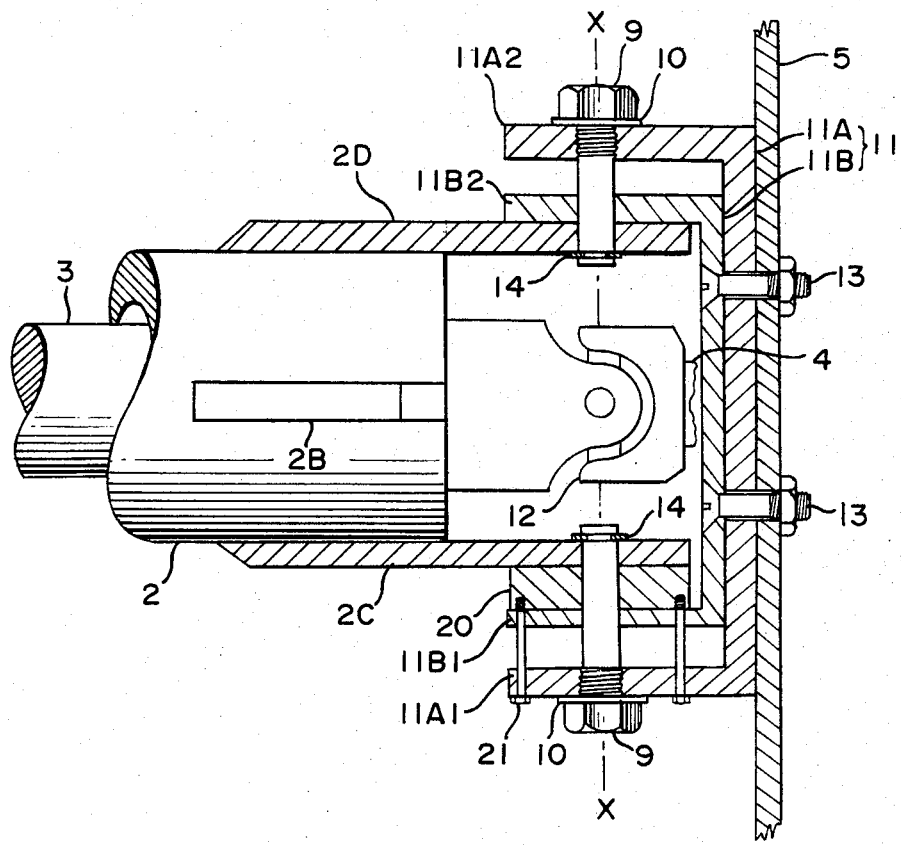
FIG. 2 is a cross-sectional view of the pivotal joint of the steering column employed in the first embodiment as shown in FIG. 1.
Figure 3:
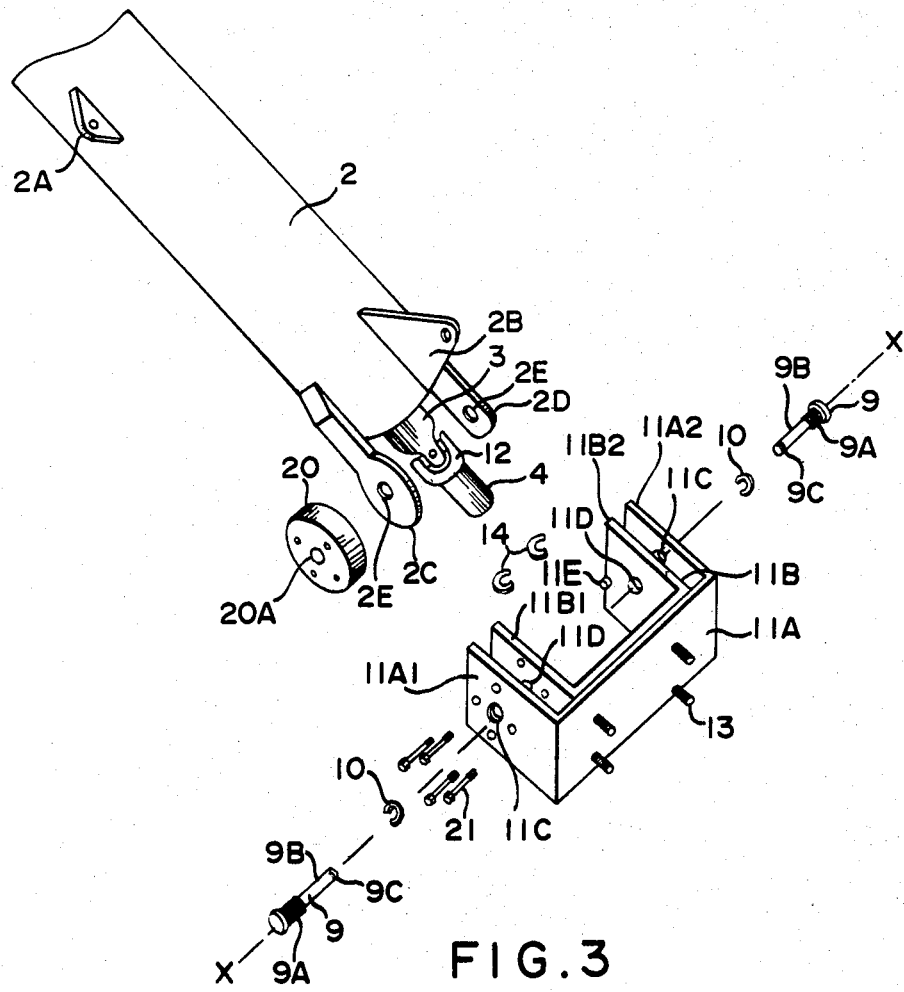
FIG. 3 is an exploded, oblique perspective view of the pivotal joint of the steering column as shown in FIG. 2.

As shown in FIGS. 2 and 3, base 11 consists of an outer U-shaped member 11A and an inner U-shaped member 11B which are fastened together and fixedly mounted onto chassis 5 by means of screws 13. Outer U-shaped member 11A is provided with first side plate 11A1 and second side plate 11A2 each having a threaded hole 11C (FIG. 3) along a common pivot axis X—X. Inner U-shaped member 11B is provided with first side plate 11B1 and second side plate 11B2 each having a pivot hole 11D along the same pivot axis X—X. Second side plate 11B2 is further provided with a dog member 11E at the inner surface to be described later. The lower end of steering column 2 is provided with a first yoke 2C made of steel or iron plate at one side and a second yoke 2D at the opposite side, each yoke having a through hole 2E as shown in FIG. 3. A circular magnet device 20, which may be either a permanent magnet piece or an electrically induced magnet, i.e., an electromagnetic device, is fixedly mounted to the inner side of the first side plate 11B1 of the inner U-shaped member 11B by capscrews 21. First yoke 2C is pivotally connected to first side plates 11A1 and 11B1 by pivot pin 9 having screw-threaded portion 9A (FIG. 3) in screw-thread engagement with threaded hole 11C of first side plate 11A1 of outer U-shaped member 11A and body portion 9B passing through hole 11D of first side plate 11B1 of inner U-shaped member 11B, central hole 20A of magnet device 20 and through hole 2E of first yoke 2C in such a manner that first yoke 2C, which is magnetically permeable, abuts magnet device 20 as shown in FIG. 2. The free end of pivot pin 9 is provided with a groove 9C in which circlip 14 is inserted to prevent pivot pin 9 from axial movement.

Second yoke 2D is pivotally connected to second side plates 11A2 and 11B2 by pivot pin 9 in the similar manner as first yoke 2C except that second side plate 11B2 is not provided with a magnet device.

Dog member 11E is provided on the inner side of the second side plate 11B2 as shown in FIG. 3, so as to stop second yoke 2D from pivoting further rearward when steering column 2 is pivoted to its farmost rearward position.

With first yoke 2C abutting magnet device 20, first yoke 2C is magnetically pulled to press on magnet device 20 and thus a friction is produced at the contact between first yoke 2C and magnet device 20, so as to hold steering column 2 in position when steering column is not being pushed or pulled to pivot with respect to pivot axis X—X.

Figure 4:
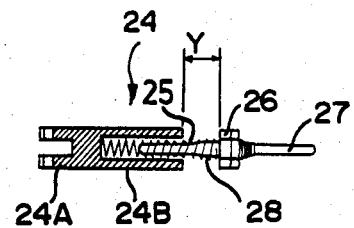
FIG. 4 is a cross-sectional view of the adapter which operatively connects the steering column and the piston rod of the master cylinder.

Referring to FIG. 4 wherein a detail of adapter 24 is shown. Adapter 24 has one end 24A formed into a yoke shape which is pivotally connected to second bracket 2B of steering column 2, and another end 24B formed into a hollow body to receive an extension rod 28 integrally formed and extending from piston rod 27 of master cylinder 7, not shown. An adjusting nut 26 is provided between piston rod 27 and extension rod 28, and a spring 25 is provided to urge piston rod 27 and adapter 24 away from each other.

Spring 25 is so selected to give minimal resilience force which is incapable of causing piston rod 27 to move when adapter 24 is pushed towards piston rod 27, without causing the end of the adapter 24 to physically abut the adjusting nut 26.

Figure 5:
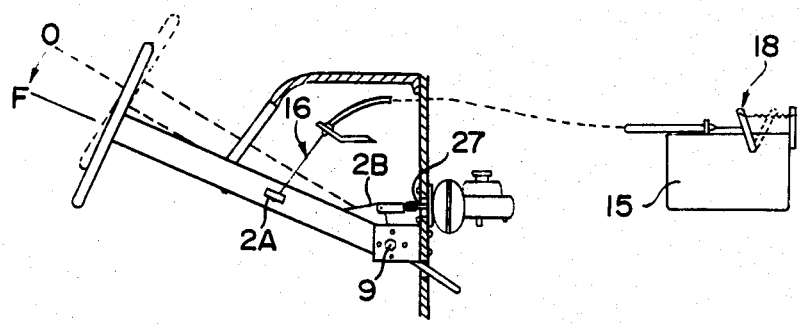
FIG. 5 is a schematic diagram of the first embodiment as shown in FIG. 1, showing an accelerating operation.

Referring to FIGS. 4 and 5, when steering column 2 is pulled rearward to its farmost position F (FIG. 5), adapter 24 is at a position (FIG. 4) where a certain distance Y between the end of adapter 24 and adjusting nut 26 is maintained so as to allow complete release of the brake. Steering column 2 is allowed to pivot forward to position O, causing adapter 24 to move the distance Y without positively pushing piston rod 27.

To accelerate the automobile, steering column 2 is pulled rearward to pivot counterclockwise from position O to position F as shown in FIG. 5, whereby accelerator cable 16 is pulled to activate accelerating unit 15 while the brake is kept completely released by causing adapter 24 to depart from adjusting nut 26 as described above, and the engine speed is thus increased.

Figure 6:
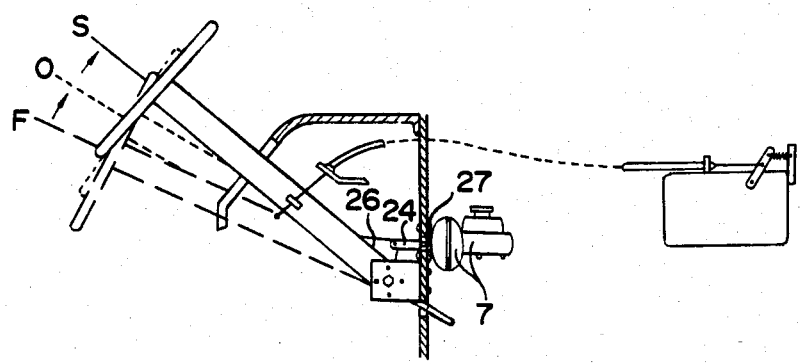
FIG. 6 is a schematic diagram of the first embodiment as shown in FIG. 1, showing a braking operation.

To decelerate the automobile, steering column 2 is pushed forward to pivot clockwise from position F to position O as shown in FIG. 6, whereby the engine speed is reduced to a pre-determined speed without the brake being applied.

To brake or to stop the automobile, steering column 2 is further pushed forward to pivot clockwise from position O to position S, as shown in FIG. 6, whereby piston rod 27 is positively pushed by adapter 24 to actuate master brake cylinder 7.

Figure 7:
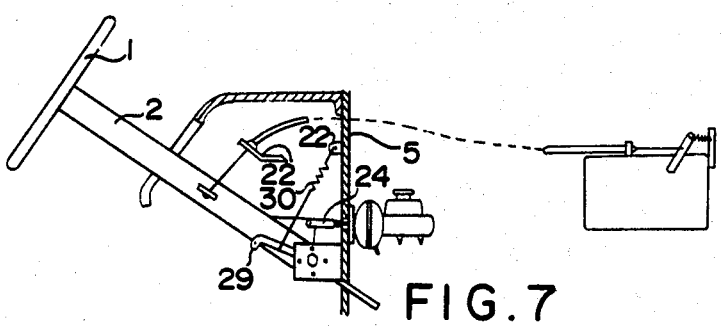
FIG. 7 is a schematic diagram of a second embodiment of the steering column-operated accelerating and braking device of this invention.

FIG. 7 shows a second embodiment of the steering column-operated accelerating and braking device of this invention. In this embodiment, an auxiliary lever 29 is added to the pivot joint with the magnet device rearranged as shown in FIG. 8, auxiliary lever 29 being provided with a spring 30 (FIG. 7) suspending auxiliary lever 29 from chassis 5.

Figure 8:
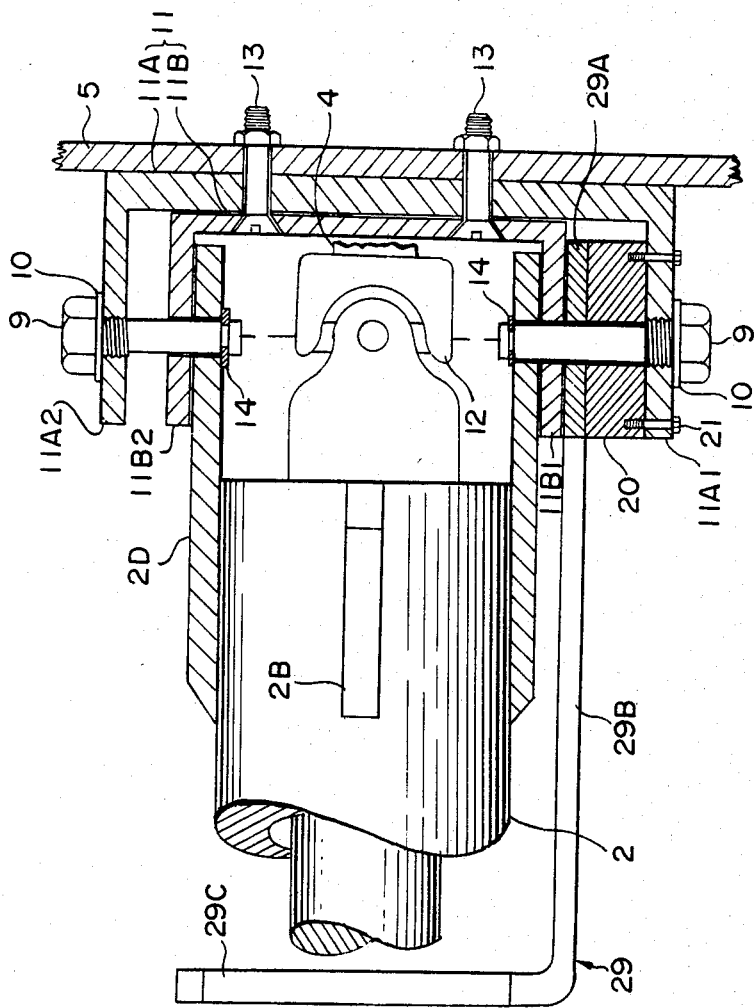
FIG. 8 is a cross-sectional view of the pivotal joint of the steering column employed in the second embodiment as shown in FIG. 7.
Figure 9:
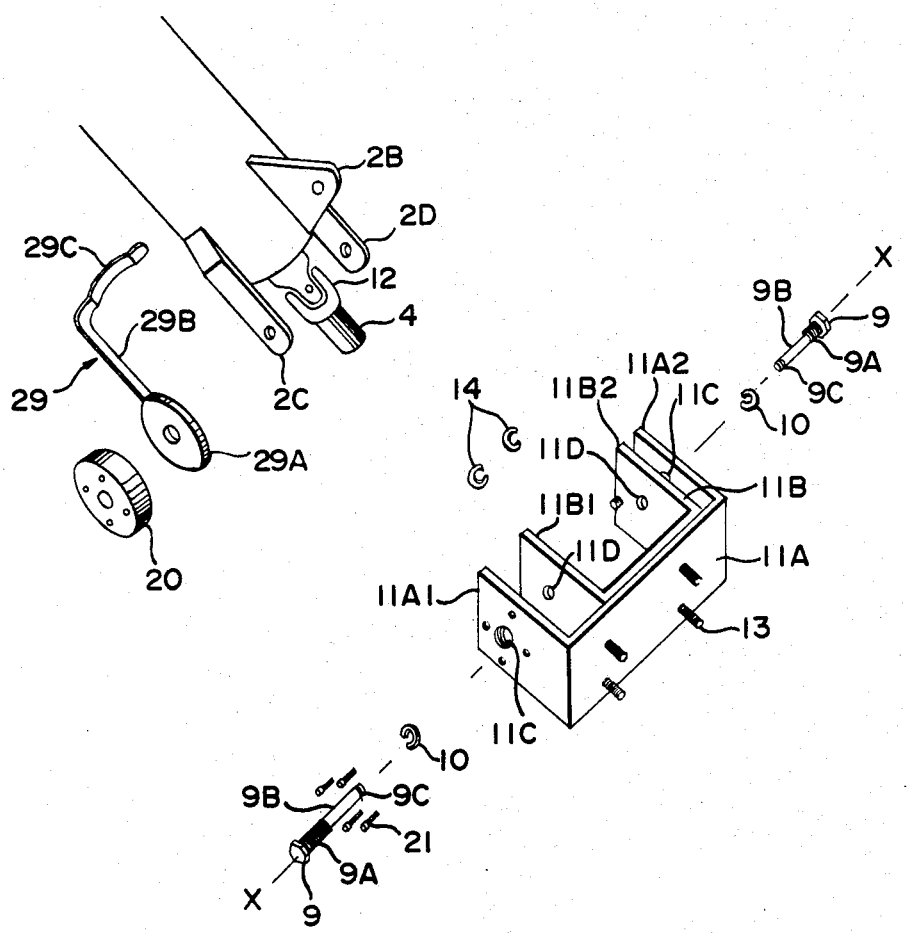
FIG. 9 is an exploded oblique perspective view of the pivotal joint of the second embodiment as shown in FIG. 8.

FIG. 8 shows a detail of the pivot joint of the steering column according to the second embodiment. Base 11 consists of outer U-shaped member 11A and inner U-shaped member 11B as in the case of the first embodiment. First yoke 2C and second Yoke 2D are respectively pivotally supported by pivot pins 9 onto first side plates 11A1 and 11B1, and second side plates 11A2 and 11B2. Circular magnet device 20 is fixedly mounted onto the inner side of first side plate 11A1 of outer U-shaped member 11A. Auxiliary lever 29, as shown in FIG. 7, being generally formed into an L-shape and having one leg 29B provided with disc 29A and another leg 29C arcuated, is pivotally mounted onto the outer side of first side plate 11B1 of inner U-shaped member 11B by pivot pin 9, so that disc 29A abuts magnet device 20. Disc 29A is made of steel or iron plate and thus magnetically permeable, and therefore disc 29 is magnetically pulled to press on magnet device 20 to constitute a friction contact to hold auxiliary lever 29 in position. Arcuated leg 29C of auxiliary lever 29 is arranged to fit steering column 2 from the underside so as to support steering column 2. Spring 30 has one end hooked onto chassis 5 and another end hooked onto auxiliary lever 29 so as to pull auxiliary lever 20 to pivot towards steering column 2.

The remaining parts of the second embodiment are the same as the first embodiment.

Figure 10:
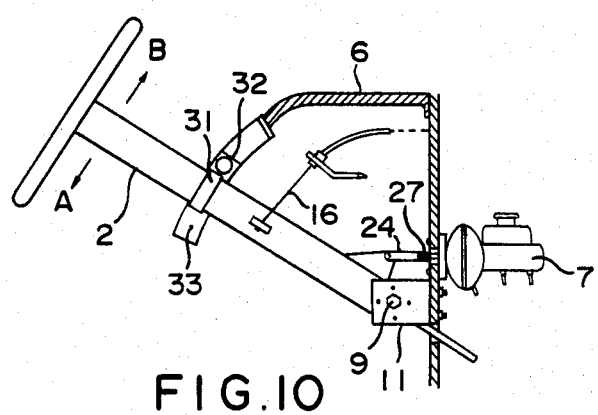
FIG. 10 is a schematic diagram of a third embodiment of the steering column-operated accelerating and braking device of this invention.

FIG. 10 shows a third embodiment of the device of this invention. In this embodiment, the lower end of steering column 2 is pivotally mounted onto base 11 by pivot pins 9 without magnet device 20 of the first and second embodiments, a magnet device 32 is provided instead to hold steering column 2 on holding plates 33A and 33B mounted onto dashboard 6, magnet device 32 being securely mounted onto steering column by mounting collar 31.

Figure 11:
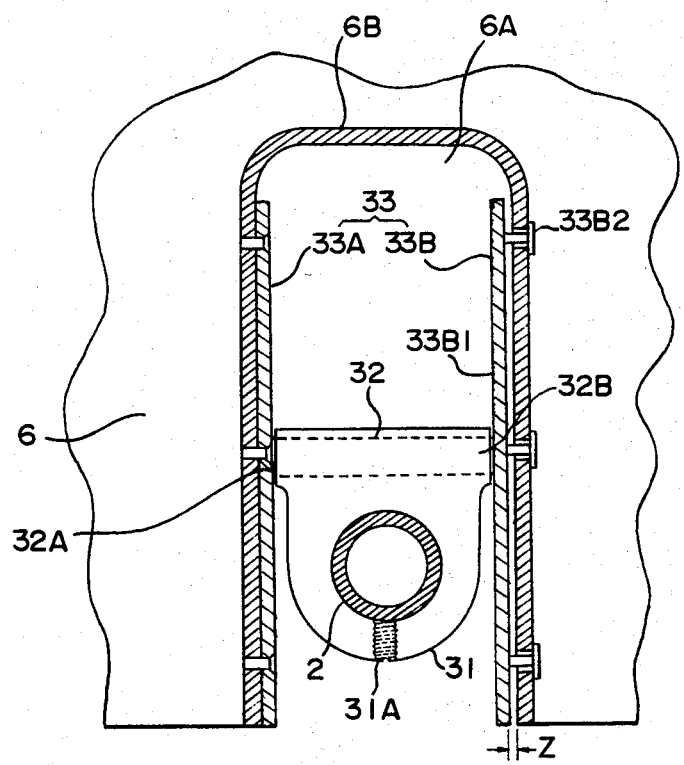
FIG. 11 is a top view of the magnet device employed in the third embodiment as shown in FIG. 10, with the steering column shown in section.

FIG. 11 shows a detail of the mounting of magnet device 32 employed in the third embodiment of this invention. As shown in FIG. 11, magnet device 32 is of bar-shaped and is transversally mounted onto steering column 2 by mounting collar 31 which is passed over and fixed on steering column 2 by set screw 31A. Magnet device 32 has a first end surface 32A adapted to abut the surface of first holding plate 33A which is made of steel or iron plate and is fixedly mounted onto one edge of cutout 6A of dashboard 6, cutout 6A being reinforced with an U-frame; and a second, opposite end surface 32B adapted to abut the surface of second holding plate 33B which is also made of steel or iron plate and is provided with studs 33B2 which are axially slidably retained by the opposite edge of cutout 6A. A small clearance Z between second holding plate 33B and the edge of the cutout 6A is maintained to allow a free movement of second holding plate 33B1 toward and away from magnet device 32, so as to enable magnet device 32 to pull both of first and second holding plates 33A and 33B to press thereon to produce a friction contact at both sides, and steering column 2 is thus magnetically held in place.

Figure 12:
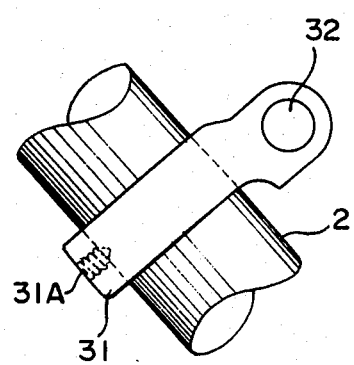
FIG. 12 is a side view of the magnet device employed in the third embodiment of this invention.

FIG. 12 shows a side view of mounting collar 31 and magnet device 32, mounted on steering column 2.

By pushing or pulling steering column 2 to pivot in direction A or B (FIG. 10), magnet device 32 is caused to slide along the surface of first and second holding plate 33A and 33B.

Magnet device 20 of the first and second embodiments and magnet device 32 of the third embodiment may be an electromagnetic device instead of a permanent magnet piece. Electromagnetic device is particularly preferable for the device of the second embodiment.

Figure 13:
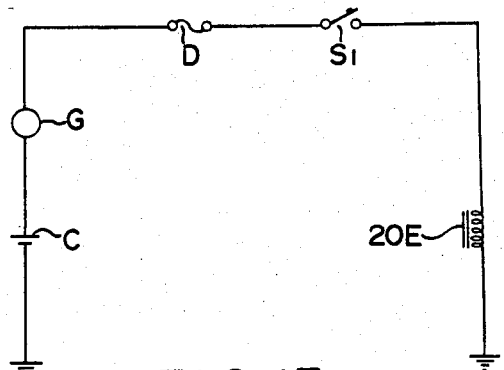
FIG. 13 is an electric circuit diagram for the magnet device employed in the embodiments of the steering column-operated accelerating and braking device of this invention.

An electric circuit diagram of such an electromagnetic device 20E is shown in FIG. 13, wherein C represents a battery; G, an ignition switch; D, a fuse $S_1$, a control switch; control switch $S_1$ being of normally closed type and located in a position that can be easily reached by the driver, such as on the spoke of the steering wheel or the dashboard of the automobile. In this arrangement, electromagnetic device 20E is energized to hold steering column 2 as soon as ignition key G is turned on. Control switch $S_1$ is turned off to de-energize electromagnetic device 20E when one wants to pivotally push or pull steering column 2, not shown, to actuate the brake or the accelerator, so that the resistance to pivotal pushing or pulling is reduced. It is to be understood that the steering wheel is being held by the driver's hand when control switch $S_1$ is turned off, so as to prevent the steering column 2 from pivoting rearward by its own weight when electromagnetic device 20E is de-energized. As soon as the steering column 2 is pivotally pushed to operate the brake or the accelerator, control switch $S_1$ which has previously been turned off is then turned on to energize electro-magnetic device 20E to hold the steering column in position.

Figure 14:
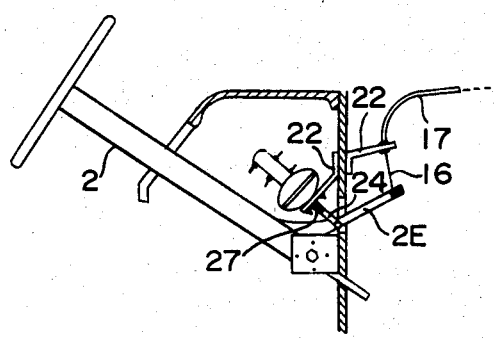
FIG. 14 is a schematic view showing an alternative arrangement of the device of this invention.

FIG. 14 shows an alternative arrangement of the device of this invention, wherein accelerator cable 16 and piston rod 24 are both connected to third bracket 2E instead of first and second brackets 2A and 2B as in the previous embodiments. This arrangement reverses the operation of the accelerator and the brake in association with the pivotal movements of steering column 2, as one may so prefer.

With the arrangements described above, the steering column-operated accelerating and braking device of this invention will advantageously enable handicapped persons to enjoy driving without the need of using their legs.

What is claimed is:

1. A steering column-operated accelerating and braking device for automobiles, comprising:
    a steering column having an upper end and a lower end, the upper end having a steering wheel rotatably mounted thereto and the lower end being pivotally mounted with a mounting base onto a structural part of the automobile so that the upper end of the column can be selectively moved fore and aft;
    an accelerator cable having one end operatively connected to said steering column and another end operatively connected to an accelerating unit adapted to accelerate the automobile when said steering column is pivoted in one direction;
    a master brake cylinder having a piston rod operable by said steering column, said master brake cylinder being adapted to apply the brake on the automobile when said steering column is pivoted in the opposite direction;
    magnetic means for holding said steering column in position when it is not being selectively moved fore and aft;
    wherein said magnetic means comprises a magnetic holding device to hold said steering column in fixed position when said steering column is not being pivotally operated;
    wherein said magnetic holding device is provided on said mounting base and disposed in a frictional engagement with a pivotal part of said steering column; and
    wherein said magnetic holding device is an electromagnetic piece electrically connected to a series electric circuit having a battery, an ignition switch of the automobile, a fuse and a control switch.

2. A steering column-operated accelerating and braking device for automobiles, comprising:
    a steering column having an upper end and a lower end, the upper end having a steering wheel rotatably mounted thereto and the lower end being pivotally mounted with a mounting base onto a structural part of the automobile;
    an accelerator cable having one end operatively connected to said steering column and another end operatively connected to an accelerating unit adapted to accelerate the automobile when said steering column is pivoted in one direction; and
    a master brake cylinder having a piston rod operable by said steering column, said master brake cylinder being adapted to apply the brake on the automobile when said steering column is pivoted in the opposite direction;
    a magnetic holding device adapted to hold said steering column in position when said steering column is not pivotally operated, a lever member having one leg provided with a disc which is magnetically permeable and pivotally mounted on the same mounting base, and another leg arcuated to fit said steering column from the underside thereof; and a spring suspending said lever member to the chassis of the automobile; wherein said magnetic holding device is provided on said mounting base and disposed in a frictional engagement with said disc of said lever member.

3. A steering column-operated accelerating and braking device for automobiles, comprising:
    a steering column having an upper end and a lower end, the upper end having a steering wheel rotatably mounted thereto and the lower end being pivotally mounted with a mounting base onto a structural part of the automobile;
    an accelerator cable having one end operatively connected to said steering column and another end operatively connected to an accelerating unit adapted to accelerate the automobile when said steering column is pivoted in one direction; and
    a master brake cylinder having a piston rod operable by said steering column, said master brake cylinder being adapted to apply the brake on the automobile when said steering column is pivoted in the opposite direction;

a magnetic holding device adapted to hold said steering column in position when said steering column is not being pivotally operated, wherein said magnetic holding device is provided on the upper portion of said steering column and disposed in frictional contact at two opposite sides with a pair of plate members mounted onto the automobile dashboard, said plate members being magnetically permeable and being capable of allowing said magnetic holding device to slide therealong when said steering column is pushed or pulled to pivot.

4. A steering column-operated accelerating and braking device as recited in claim 2, or 3, wherein said magnetic holding device is a permanent magnet piece.

5. A steering column-operated accelerating and braking device as recited in claim 2, or 3, wherein said magnetic holding device is an electromagnetic piece electrically connected to a series electric circuit having a battery, an ignition switch of the automobile, a fuse and a control switch.

* * * * *